US011613357B2

(12) United States Patent
Trotter (10) Patent No.: US 11,613,357 B2
(45) Date of Patent: Mar. 28, 2023

(54) AERIAL DISPERSAL MECHANISMS, AIRCRAFTS AND RETROFIT METHODS

(71) Applicant: Victor D. Trotter, Fort Worth, TX (US)

(72) Inventor: Victor D. Trotter, Fort Worth, TX (US)

( * ) Notice: Subject to any disclaimer, the term of this patent is extended or adjusted under 35 U.S.C. 154(b) by 49 days.

(21) Appl. No.: 17/198,360

(22) Filed: Mar. 11, 2021

(65) Prior Publication Data

US 2022/0024587 A1 Jan. 27, 2022

Related U.S. Application Data

(60) Provisional application No. 63/056,212, filed on Jul. 24, 2020.

(51) Int. Cl.
*B64D 1/16* (2006.01)
(52) U.S. Cl.
CPC ..................... *B64D 1/16* (2013.01)
(58) Field of Classification Search
CPC ... B64D 1/00; B64D 1/02; B64D 1/16; B64D 1/18; B64D 1/20
USPC ........................................ 239/666
See application file for complete search history.

(56) References Cited

U.S. PATENT DOCUMENTS

| | | | |
|---|---|---|---|
| 2,986,360 A | 5/1961 | Rutten | |
| 3,423,053 A | 1/1969 | Hawkshaw | |
| 3,777,978 A * | 12/1973 | Manicatide | A01M 9/00 267/136 |
| 3,860,202 A * | 1/1975 | Johnson | B64D 1/16 222/189.02 |
| 3,920,184 A | 11/1975 | Waldrum | |
| 4,382,568 A * | 5/1983 | Schertz | B64D 1/16 244/136 |
| 4,979,571 A * | 12/1990 | MacDonald | A62C 5/02 169/44 |

(Continued)

FOREIGN PATENT DOCUMENTS

WO  WO-2020124129 A1 *  6/2020  .......... A62C 3/0235

OTHER PUBLICATIONS

International Search Report, issued in connection with PCT/US2141319, dated Oct. 26, 2021, 7 pages.

*Primary Examiner* — Joshua J Michener
*Assistant Examiner* — Ryan Andrew Yankey
(74) *Attorney, Agent, or Firm* — bobharter.com; Robert J. Harter (57) ABSTRACT

Some example systems and methods for retrofitting bulk product dispersal mechanism of aircrafts (e.g., aerial crop dusters, air tankers, airplanes and helicopters) involve replacing one link of the dispersal mechanism's linkage assembly with a powered linear actuator. The linkage assembly connects a manually operated lever in the cockpit to a movable gate at an outlet of a bulk container of the aircraft. The bulk container carries a bulk product, such as dry fertilizer or fire extinguishing liquid. In some examples, the pilot can operate the lever to control the release and aerial dispersion of the bulk material. With the powered linear actuator, however, the lever can be latched at a stationary position, while the powered linear actuator extends or retracts to respectively open or close the gate. In an emergency, a brake on the linear actuator allows the pilot to seamlessly switch from a power mode to a manual mode.

11 Claims, 11 Drawing Sheets

(56) References Cited

U.S. PATENT DOCUMENTS

| | | | |
|---|---|---|---|
| 5,148,989 A | 9/1992 | Skinner | |
| 5,279,481 A | 1/1994 | Trotter et al. | |
| 6,003,782 A | 12/1999 | Kim et al. | |
| 8,365,762 B1 | 2/2013 | Trotter | |
| 8,450,998 B2 | 5/2013 | Reabe | |
| 8,870,101 B2* | 10/2014 | Gibson | E01C 19/2025 |
| | | | 239/674 |
| 9,346,546 B2 | 5/2016 | Markov | |
| 9,428,271 B2 | 8/2016 | Becks et al. | |
| 11,094,282 B1* | 8/2021 | Kuefler | G09G 5/006 |
| 11,239,728 B2* | 2/2022 | Borgarelli | F16H 25/20 |
| 2014/0145007 A1* | 5/2014 | Thompson | B64D 1/16 |
| | | | 239/171 |
| 2014/0145034 A1* | 5/2014 | Thompson | A01C 7/085 |
| | | | 244/136 |
| 2020/0010196 A1 | 1/2020 | Trotter | |
| 2020/0148358 A1* | 5/2020 | Reabe | E05F 15/53 |
| 2020/0166401 A1 | 5/2020 | Reabe | |
| 2021/0107630 A1* | 4/2021 | Reabe | G05G 5/005 |

* cited by examiner

AERIAL DISPERSAL MECHANISMS, AIRCRAFTS AND RETROFIT METHODS

CROSS REFERENCE TO RELATED APPLICATIONS

This application claims the benefit of provisional patent application Ser. No. 63/056,212 filed on Jul. 24, 2020.

FIELD OF THE DISCLOSURE

This patent generally pertains to agricultural and firefighting product dispersal systems of aircrafts and more specifically to mechanisms for controlling the release of such products.

BACKGROUND

Some aircrafts (e.g., airplanes and helicopters) are used as crop dusters or air tankers for agricultural and/or firefighting purposes. Such aircrafts typically include a bulk container for carrying a flowable bulk product, such as dry fertilizer, liquid fertilizer, pesticide, fire extinguishing liquid, etc.

To selectively release the product, in some examples, a linkage assembly connects a manually operated lever in the cockpit to a movable gate at an outlet of the bulk container. The pilot operates the lever to open and close the gate, and thereby controls the release of the bulk product. When released, the bulk product is dispersed along the aircraft's trailing flight path.

DETAILED DESCRIPTION

FIGS. 1-10 pertain to a product dispersal apparatus 10 of an aircraft 12. The aircraft's product dispersal apparatus 10 controllably releases a flowable bulk product 14 from a bulk container 16 of the aircraft. The released bulk product 14 is thereby dispersed along the aircraft's trailing flight path. The aerial dispersal of bulk product 14 is particularly suited for agricultural and firefighting purposes.

The term, "aircraft" refers to any flying machine. Some examples of aircraft 12 include an aerial crop duster, air tanker, an airplane, a helicopter, an Air Tractor AT402, an Air Tractor AT502, an Air Tractor AT602, an Air Tractor AT802A, an Air Tractor AT802F, a Thrush aircraft, and a Dromodier aircraft. The term, "aerial crop duster" refers to any aircraft equipped with a product dispersal apparatus for releasing bulk product 14 in either a dry or liquid form that either promotes or inhibits the growth of vegetation (crops, weeds, plants, trees, etc.).

The term, "bulk product" refers to any liquid or dry material that is sufficiently loose to flow through an outlet opening. Some examples of bulk product 14 include a liquid, a granular material, a fluidized or otherwise agitated bed of material, fertilizer, pesticide, herbicide, insects, water, dry ice, fire extinguishing liquids, seeds, ammonia nitrate, ammonia sulfate, potash, urea, and various combinations thereof.

The term, "bulk container" refers to any structure defining a space for holding bulk product 14. Some examples of bulk container 16 include a hopper, a vessel, a tank, etc.

Figure 1:
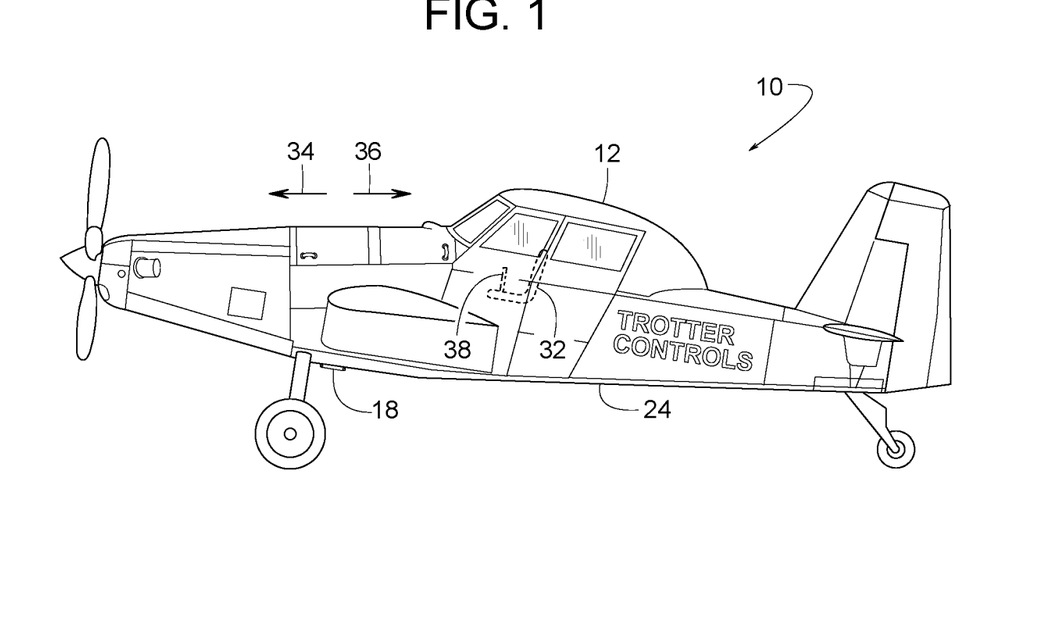
FIG. 1 is a side view of an example aircraft with an example product dispersal apparatus constructed in accordance with the teachings disclosed herein.
Figure 2:
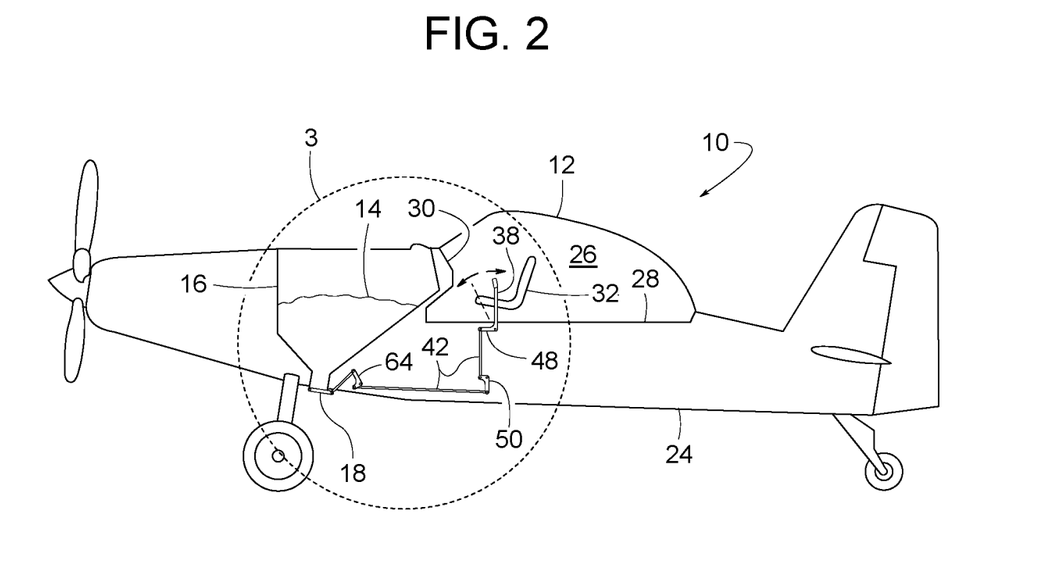
FIG. 2 is a schematic side view of the example aircraft shown in FIG. 1.
Figure 3:
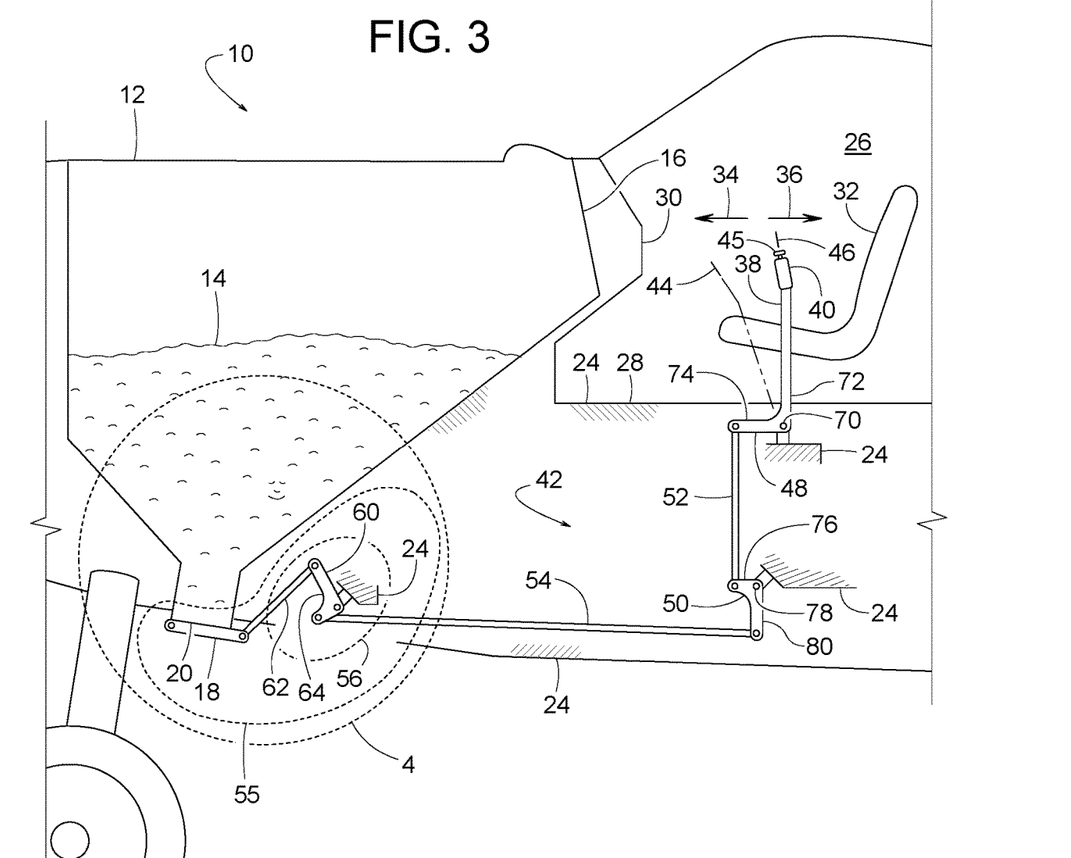
FIG. 3 is an enlarged side view of a section 3 of FIG. 2, wherein an example lever is shown in a back position, and an example gate is shown in a closed position.
Figure 4:
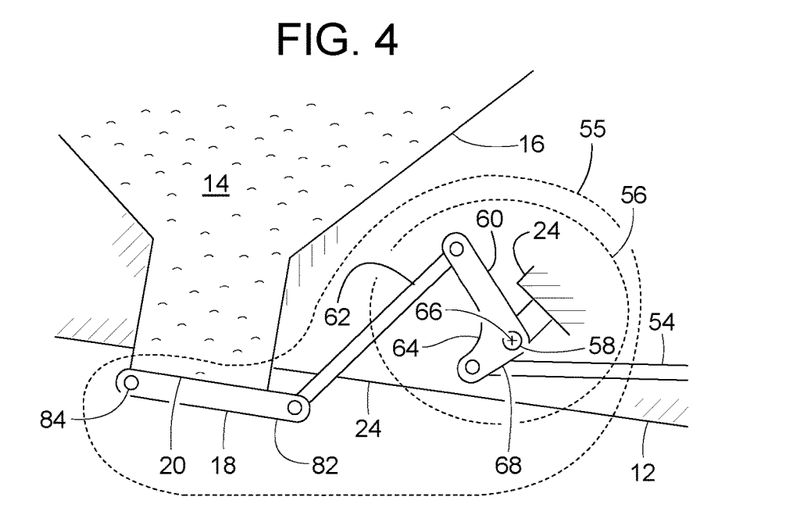
FIG. 4 is an enlarged side view of a section 4 of FIG. 3.
Figure 5:
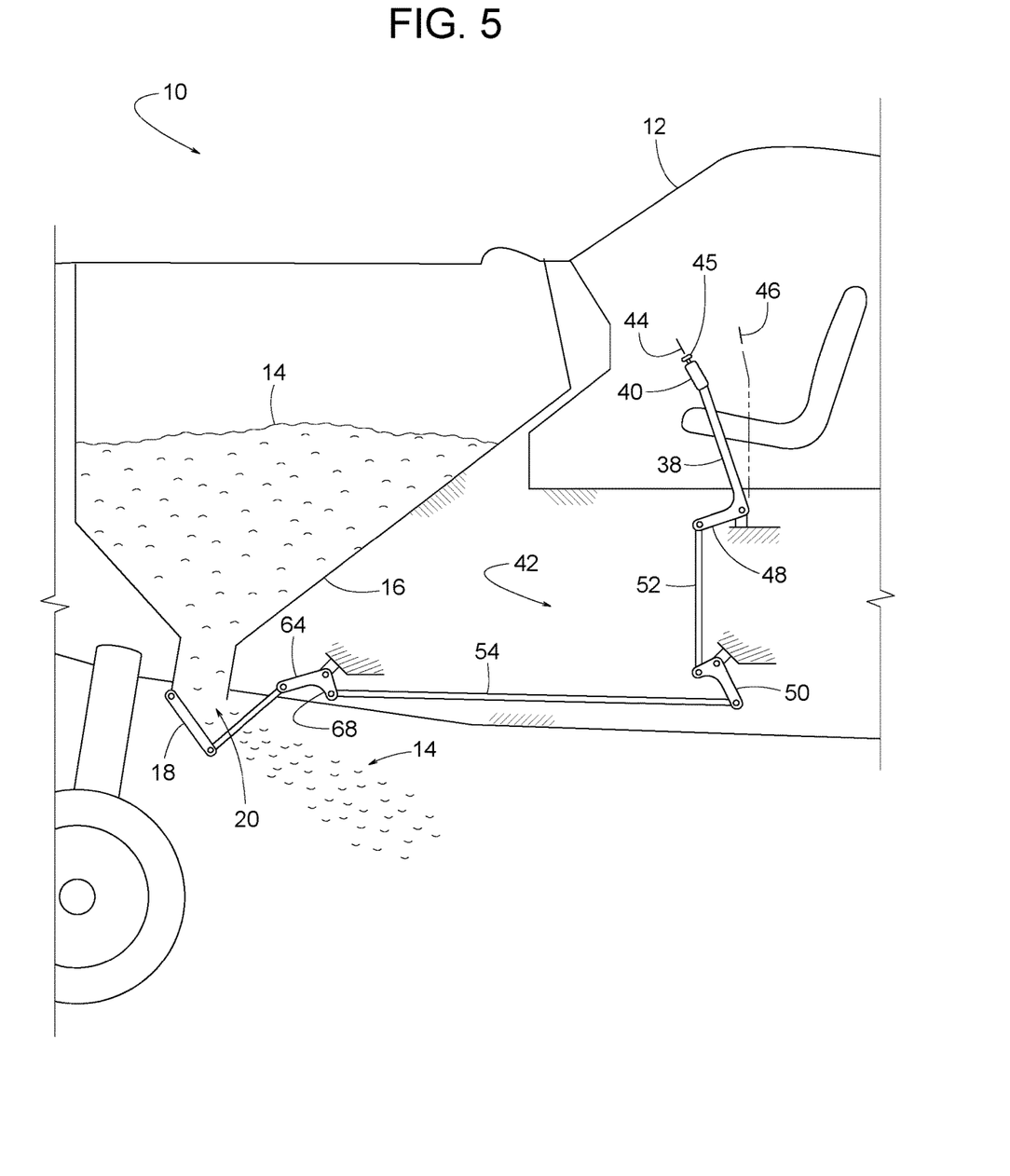
FIG. 5 is a side view similar to FIG. 3 but showing the lever in a forward position and the gate in an open position.
Figure 9:
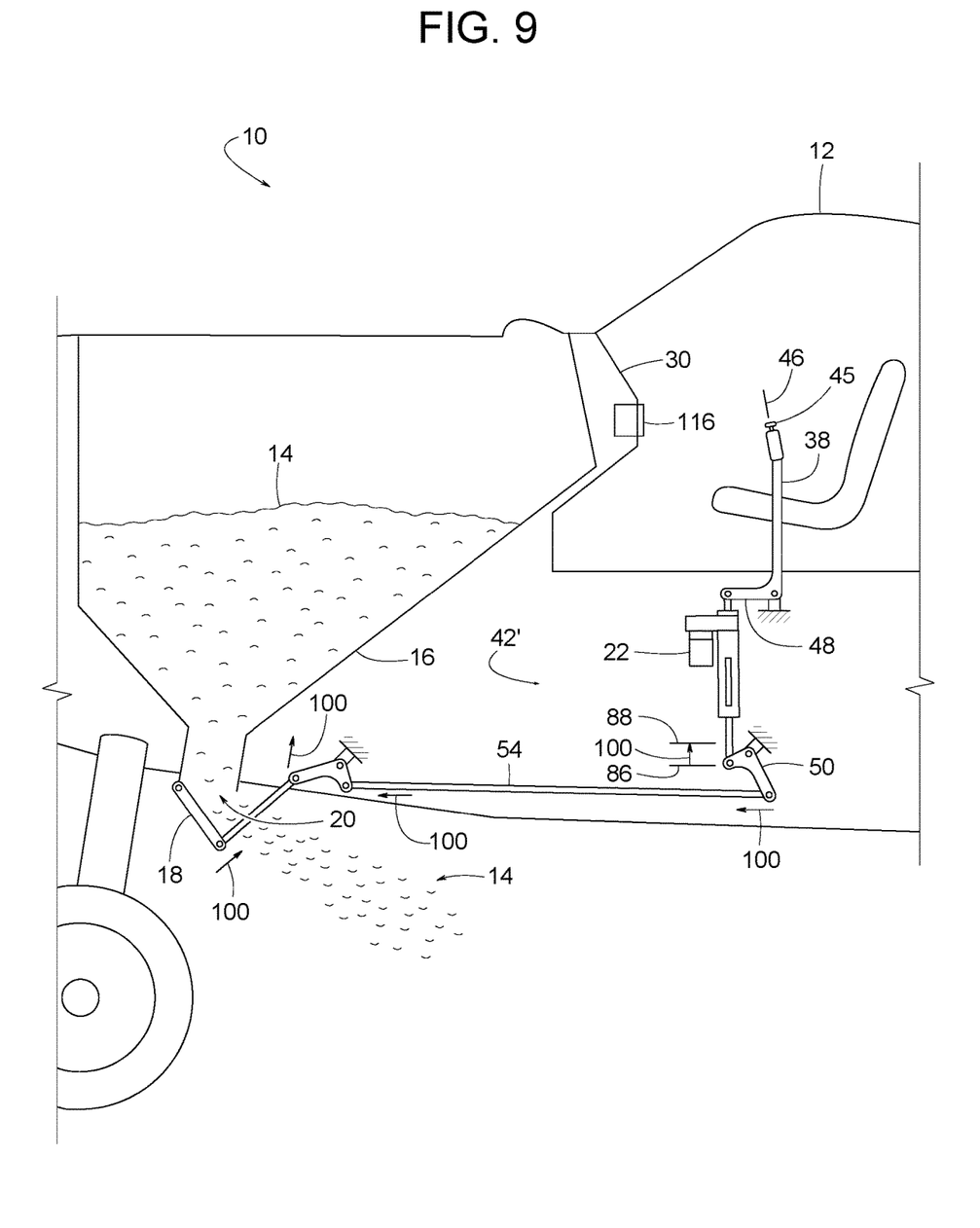
FIG. 9 is a side view similar to FIG. 8 but showing the powered linear actuator having extended to move the gate to its open position.
Figure 10:
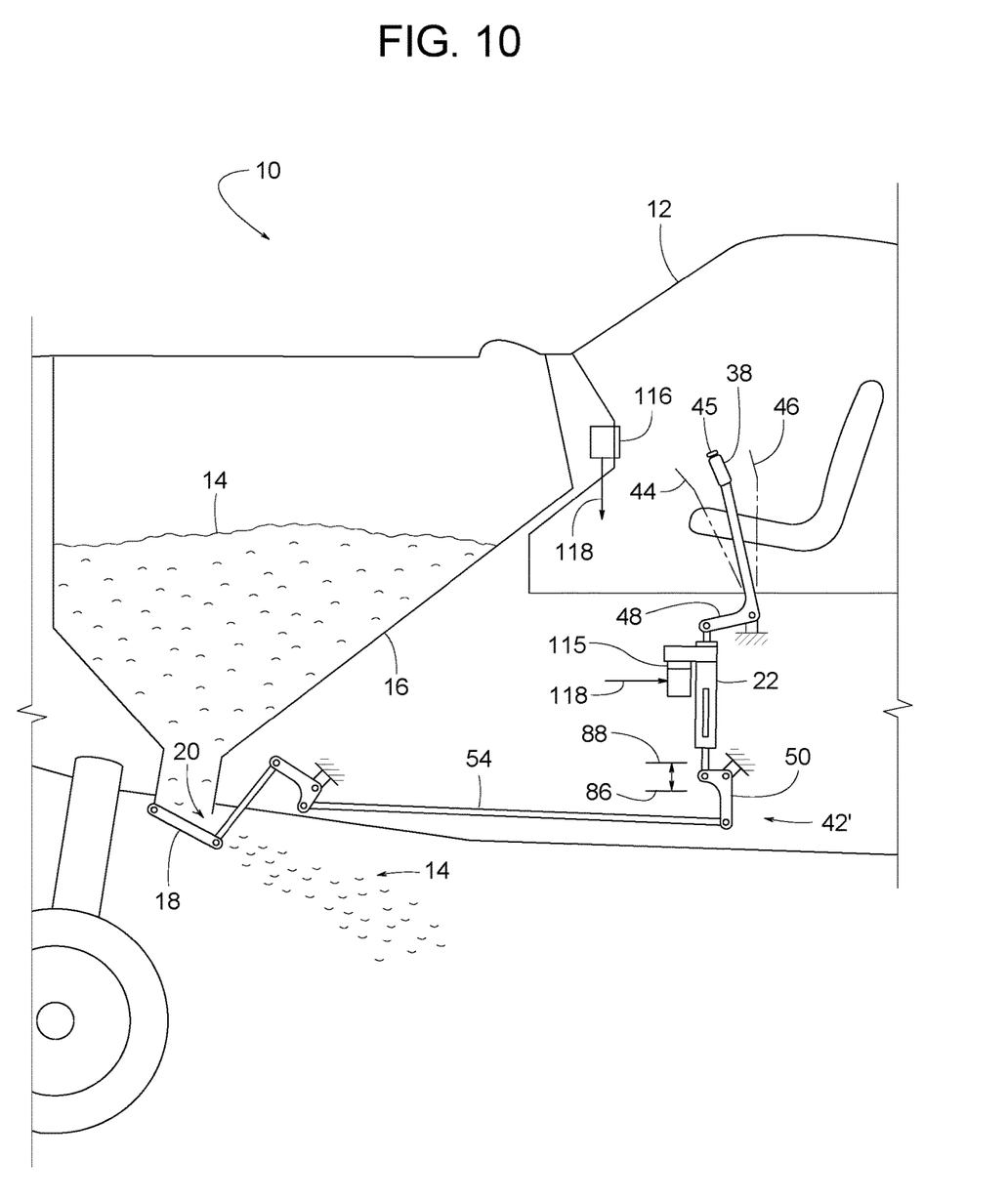
FIG. 10 is a side view similar to FIG. 10 but showing the example linkage assembly being operated in a manual mode.

In some examples, a pivotal gate 18 at an outlet 20 of bulk container 16 can be swung open to release bulk product 14. FIGS. 5, 9 and 10 show gate 18 in an open position. FIGS. 1-4 and 6-8 show gate 18 in a closed position. In some examples, gate 18 is a 5-inch, 7.5-inch or 10-inch wide gate provided by Transland of Wichita Falls, Tex. In some examples, gate 18 is one of a series of gates in a gate box assembly 55, wherein the gates open and close in unison. In some examples, gate box assembly 55, which includes or more gates 18, also includes a valve mechanism 56. Valve mechanism 56 connects to gate 18 for moving gate 18 between its open and closed positions. In some examples, Transland provides the entire gate box assembly 55 with valve mechanism 56 and one or more gates 18.

When bulk product 14 is a liquid, gate 18 in its closed position may be tightly sealed up against outlet 20. When bulk product 14 is a dry product (e.g., granules), gate 18 in its closed position might only be lightly pressed up against outlet 20 or sometimes even slightly spaced apart from it to help protect a seal between gate 18 and outlet 20.

FIGS. 1-5 show aircraft 12 in an original configuration prior to a powered linear actuator 22 (FIG. 6) being added to aircraft 12 to improve the operation of product dispersal apparatus 10. In the illustrated example, aircraft 10 includes a fuselage 24 that contains bulk container 16 and a cockpit 26. Any crosshatched item identified as fuselage 24 in the drawing figures schematically represents any structure or surface that is at a substantially fixed location relative to the actual fuselage itself. Cockpit 26 includes a floor 28, a dashboard 30, and a pilot seat 32 facing in a generally forward direction 34 (opposite a rearward direction 36).

A pivotal lever 38 with a handle 40 is installed in cockpit 26, alongside pilot seat 32. A linkage assembly 42 in fuselage 24 couples the lower end of lever 38 to gate 18. Moving lever 38 between a forward position 44 and a back position 46 respectively opens and closes gate 18. This is particularly true prior to the installation of powered linear actuator 22. Lever 38 pivots forward by the pilot moving lever 38 in forward direction 34. Conversely, lever 38 pivots back by moving lever 38 in rearward direction 36. Moving lever 38 in rearward direction 36 means that the lever's handle 40 or upper end is what moves in rearward direction 36.

To prevent gate 18 from opening unintentionally, some examples of lever 4 include a known mechanical pushbutton 45 at the upper end of handle 40. When lever 38 is at its back position 46 (gate 18 closed) while pushbutton 45 is released, lever 38 is held automatically latched at this back position 46. Such a latching mechanism is well known to those of ordinary skill in the art. Depressing pushbutton 45 releases lever 38, so the pilot can manually move lever 38 from its back position 46 toward its forward position 44 to open gate 18. In some examples, lever 4 and/or linkage 42 includes a known adjustment device for limiting how far gate 18 can open.

In some examples, linkage assembly 42 includes a first bell crank 48, a second bell crank 50, a first link 52, a second link 54, and a valve mechanism 56. The term, "bell crank" refers to any rotatable structure with two or more arms which rotate as a unit about a fulcrum or common axis to form a kinematically coupled rotational link or member. Each arm extends radially outward from the axis. The two or more arms can be at any angle (0-180 degrees) relative to each other. In some examples, the two or more arms lie along a common plane that is perpendicular to the axis (i.e., the arms rotate about a common point on the axis). In some examples, the two or more arms are axially offset along the axis. In some examples, the two or more arms differ in length.

Valve mechanism 56 includes a shaft 58, a crank 60, and a gate link 62 all of which, in some examples, is provided by Transland. In the illustrated example, crank 60 is a first arm of a gate bell crank 64. In some examples, gate bell crank 64 is pivotal about an axis 66 defined by shaft 58. In the illustrated example, gate bell crank 64 includes a second arm 68, wherein both arms 60 and 68 pivot in unison about axis 66. Axis 66 is at a substantially fixed location relative to fuselage 24.

First bell crank 48 is at a lower end of lever 38 and is pivotal about a fulcrum 70 at a generally fixed location relative to fuselage 24. A first arm 72 of first bell crank 48 rotates about fulcrum 70 in unison with lever 38. A second arm 74 of first bell crank 48 is pivotally connected to one end of first link 52. An opposite end of first link 52 pivotally connects to a first arm 76 of second bell crank 50. Second bell crank 50 pivots about a fulcrum 78 at a generally fixed location relative to fuselage 24. A second arm 80 of second bell crank 50 pivotally connects to one end of second link 54. An opposite end of second link 54 pivotally connects to second arm 68 of gate bell crank 64. Gate link 62 pivotally connects first arm 60 of gate bell crank 64 to a distal end 82 of gate 18. A hinge pin 84 pivotally connects gate 18 at the bulk container's outlet 20.

Prior to the installation of powered linear actuator 22, linkage assembly 42 operates as follows. Pushing handle 40 in forward direction 34 rotates lever 38 counterclockwise (from the perspective of FIG. 3). This forces first bell crank 48 to rotate counterclockwise, first link 52 to move down, second bell crank 50 to rotate counterclockwise, second link 54 to move in rearward direction 34, gate bell crank 64 to rotate counterclockwise, and gate link 62 to push gate 18 open. Conversely, pulling handle 40 in rearward direction 36 rotates lever 38 clockwise (from the perspective of FIG. 5). This causes first bell crank 48 to rotate clockwise, first link 52 to move up, second bell crank 50 to rotate clockwise, second link 54 to move in forward direction 34, gate bell crank 64 to rotate clockwise, and gate link 62 to pull gate 18 closed.

Figure 6:
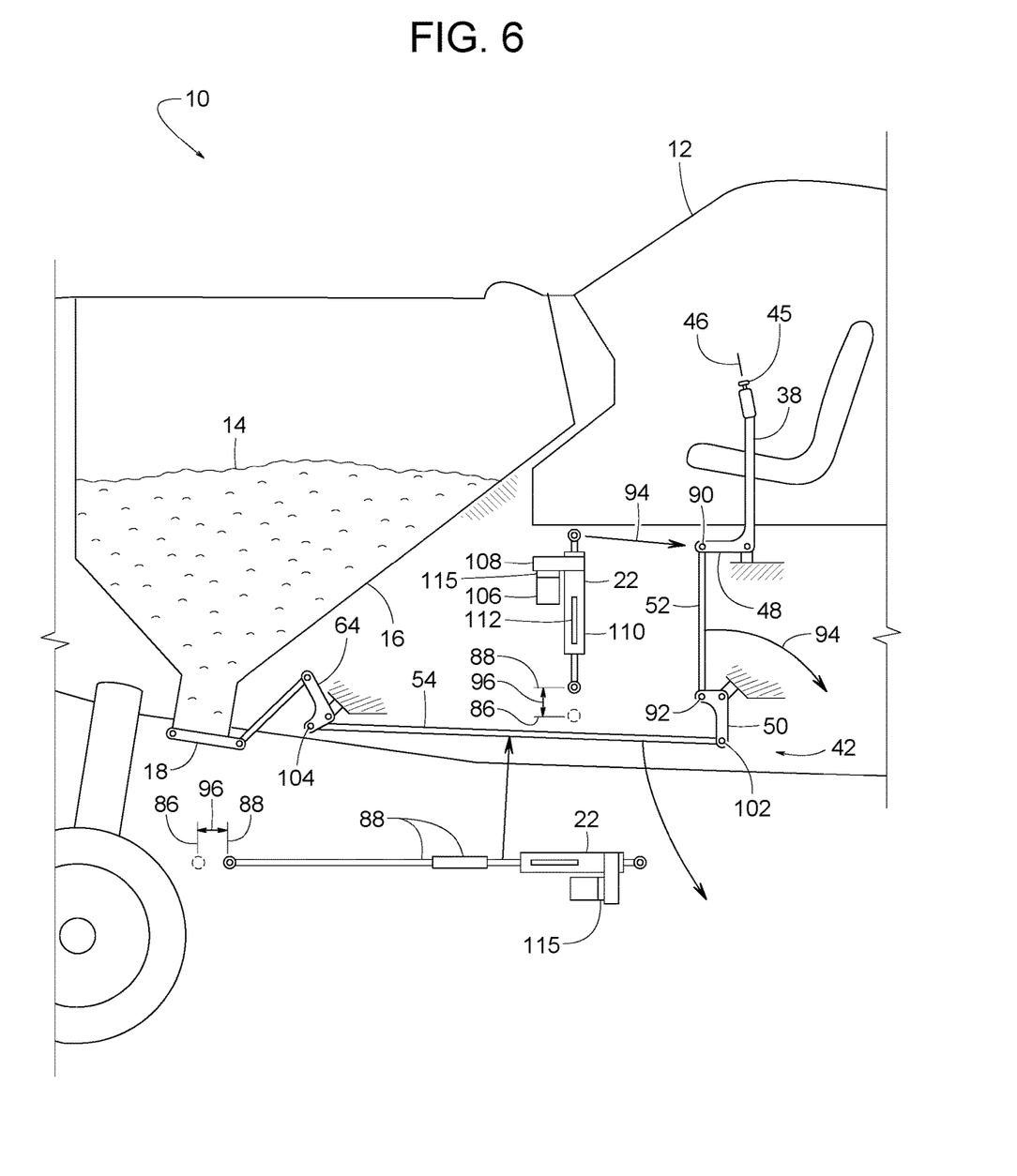
FIG. 6 is a schematic side view similar to FIG. 3 but showing an example linkage assembly about to be retrofitted with an example powered linear actuator constructed in accordance with the teachings disclosed herein.
Figure 7:
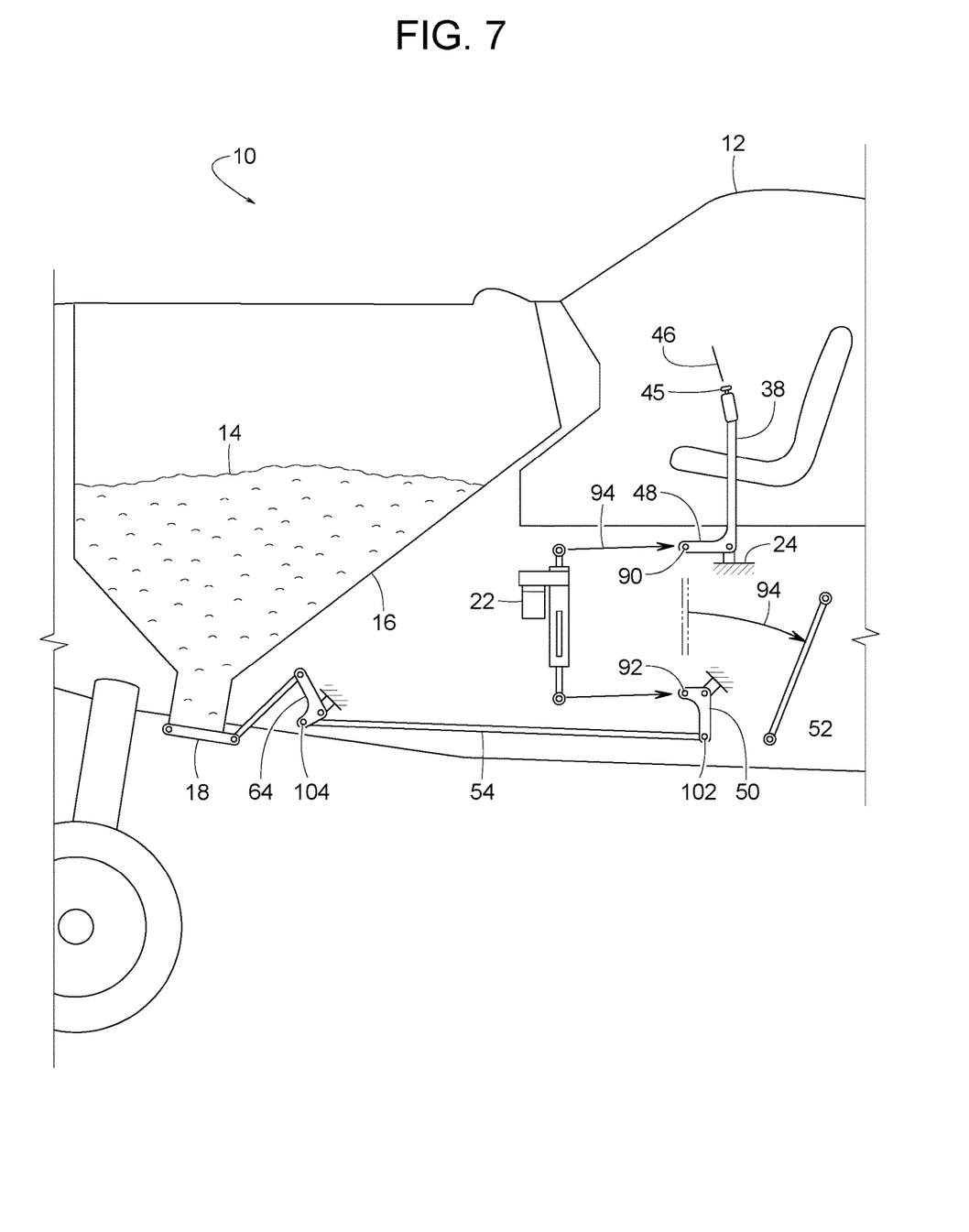
FIG. 7 is a side view similar to FIG. 6 but showing various retrofit method steps.

To ease the manual fatigue of having to repeatedly move lever 38 back and forth, some examples of aircraft 12 are retrofitted or modified by swapping out one or both of the existing links 52 or 54 with one or more powered linear actuators 22, as shown in FIGS. 6 and 7. In other examples, however, one or more powered linear actuators 22 are installed as original equipment by the manufacturer of aircraft 12 without the manufacturer ever having to install one of links 52 or 54 in the first place. In any case, the installation of powered linear actuator 22 creates a powered linkage assembly 42', as shown in FIGS. 8-10.

Figure 8:
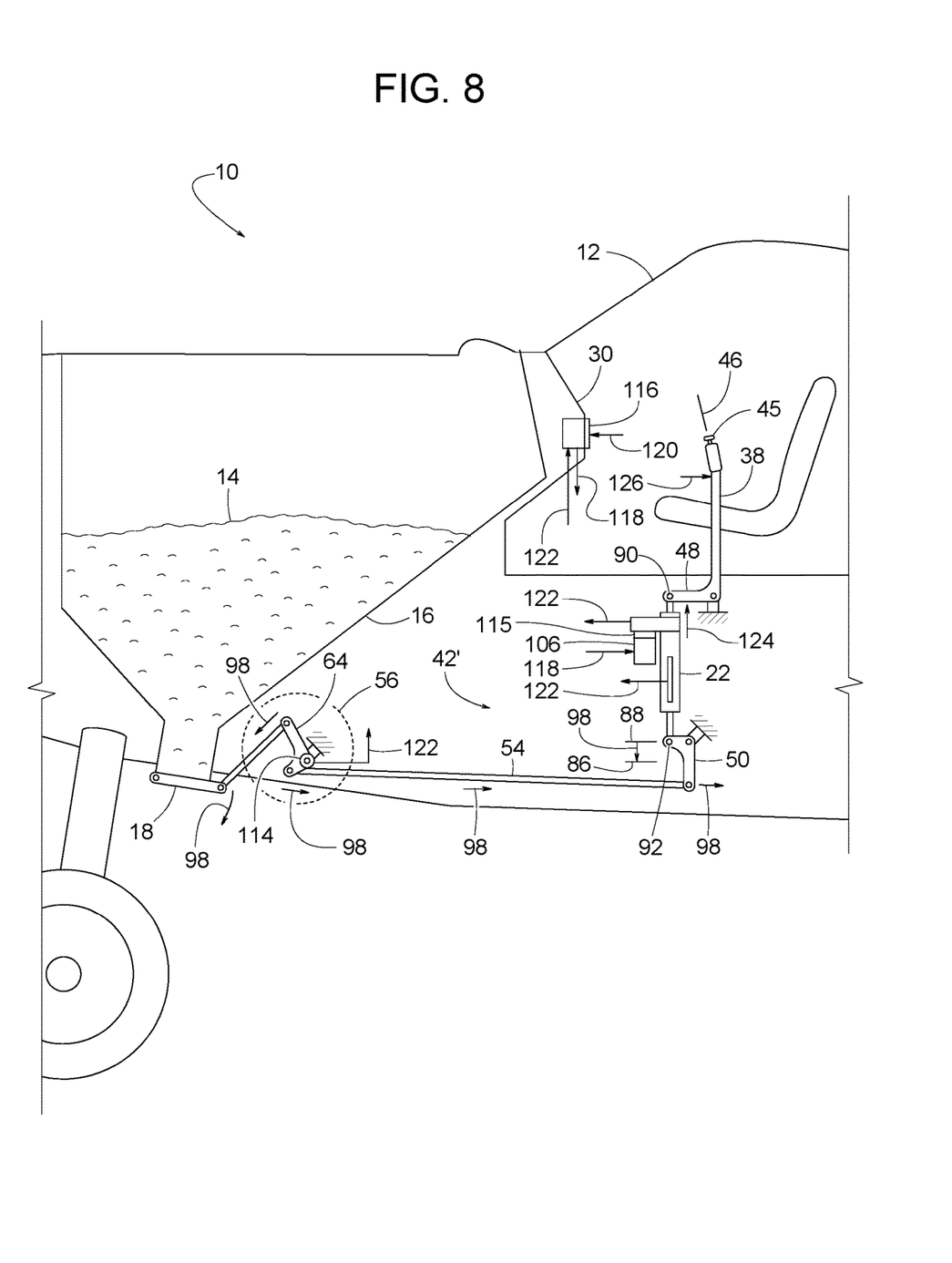
FIG. 8 is a side view similar to FIG. 3 but showing a link having been replaced by an example powered linear actuator constructed in accordance with the teachings disclosed herein.

Some examples of powered linear actuator 22 can extend and retract lengthwise between an extended position 86 (e.g., FIG. 9) and a retracted position 88 (e.g., FIGS. 6-8). With powered linear actuator 22 installed, the pilot can activate and control it to extend and retract, and thereby open and close gate 18 without ever having to move lever 38. With powered linear actuator 22, lever 38 can be kept latched and left stationary in its back position 46 while powered linear actuator 22 does all the work.

Powered linear actuator 22 is schematically illustrated to represent any device driven to extend and/or retract by electric energy, pneumatic force or hydraulic force. The term, "powered linear actuator" means one or more powered linear actuators. The use of the term, "first powered linear actuator" as it relates to a linkage assembly does not necessarily mean the linkage assembly includes a second powered linear actuator.

Activating a powered linear actuator means energizing the actuator by way of electrical, pneumatic or hydraulic energy. In some examples, powered linear actuator 22 includes a rigid extension 88 (FIG. 6) so that the actuator's overall length is substantially equal to the length of the link 54 or 52 that actuator 22 replaces.

In a retrofit example, as shown in FIGS. 6 and 7, either link 52 or 54 can be considered a replaceable link. In the illustrated example, existing first link 52 extends between a first point 90 and a second point 92 of linkage assembly 42. Arrow 94 of FIGS. 6 and 7 represents decoupling lever 38 from gate 18 by removing first link 52 (removable link) from linkage assembly 42. Arrow 94 of FIGS. 6 and 7 represents recoupling lever 38 to gate 18 by connecting powered linear actuator 22 to first point 90 and second point 92 of linkage assembly 42, and thereby creating powered linkage assembly 42'. Arrows 96 represent powered linear actuator 22 being movable selectively to an extended position 86 and a retracted position 88. Arrows 98 of FIG. 8 and arrows 100 of FIG. 9 represent moving gate 18 between its open position (FIG. 9) and its closed position (FIG. 8) in response to powered linear actuator 22 moving between its extended position 86 (FIG. 9) and its retracted position 88 (FIG. 8) while lever 38 remains at a substantially fixed position between the forward position and the back position (e.g., substantially stationary at its back position 46 shown in FIGS. 8 and 9).

The retrofit process is generally the same when powered linear actuator 22 replaces second link 54. After decoupling lever 38 from gate 18 by removing second link 54 from a first point 102 and a second point 104 of linkage assembly 42, powered linear actuator 22 with its extension 88 is attached to points 102 and 104 to recouple lever 38 to gate 18. Powered linear actuator 22 can then be controlled to open and close gate 18 in the same manner as just described with reference to the example where powered linear actuator 22 replaced first link 52.

It should be noted that with either retrofit example (replacing first link 52 or second link 54), powered linear actuator 22 is spaced apart from axis 66 (FIG. 4) of valve mechanism 56. This spaced apart arrangement provides the important benefit of not having to extensively rework or rearrange valve mechanism 56, as such rework or rearrangement of parts can be complicated, difficult, time consuming and expensive.

Although powered linear actuator 22 is schematically illustrated to represent electric, hydraulic and pneumatic style actuators; an electrically powered version of powered linear actuator 22 may provide some significant advances over hydraulic and pneumatic actuators. Hydraulic actuators and the ancillary components associated with them tend to be quite heavy. The weight, of course, places an additional load on aircraft 12. Pneumatic actuators, such as pneumatic cylinders, can be jumpy due the compressibility of gas in combination with variation in friction and variation of other forces. Thus, precise positioning of gate 18 may be difficult to achieve with pneumatic actuation.

To avoid the problems associated with hydraulic and pneumatic actuation, some examples of powered linear actuator 22 are electrically powered. In some examples, as shown in FIG. 6, powered linear actuator 22 is an assembly comprising a motor 106, a gearbox 108, and a linear actuator 110. Gearbox 108 transmits the rotational output of motor 106 to linear actuator 110. Linear actuator 110 extends and retracts in reaction to the motor's rotation. The motor's direction of rotation determines whether linear actuator 22 extends or retracts.

Some examples of motor 106 include a servo motor, a stepper motor, a brushless DC motor, an AC motor, etc. In some examples, motor 106 includes an integral or separate amplifier, an integral or separate incremental encoder, an integral or separate absolute encoder, and/or an integral or separate brake 115. A specific example of motor 106 is an EMI-09R9004 (with integral brake 115) provided by Allied Motion of Amherst, N.Y. Some examples of gearbox 108 include of set of intermeshing gears, a set of cogged sprockets with a matching cogged belt, a set of sprockets with a roller chain, and various combinations thereof. In some examples, motor 106 connects directly to linear actuator 110, thereby eliminating the need for gearbox 108.

Some examples of linear actuator 110 include a threaded nut and leadscrew, a rack and pinion, etc. A specific example of linear actuator 110 includes a PS40PA999B05-0153CMID (153 mm stroke) provided by Thomson of Radford, Va., USA. In some examples, additional components are added to linear actuator 110. Examples of such additional components include clevis mounting hardware, a ball joint rod end, extension 88, one or more position sensors, etc.

In some examples, linear actuator 110 includes an optional absolute position sensor 112 that produces a feedback voltage proportional to the position of a magnet within linear actuator 110. The use of absolute position sensor 112 avoids having to home linear actuator 110 whenever powered linear actuator 22 is first turned on. A specific example of absolute position sensor 112 is a WIM160-Q25L-LIU5X2-H1141 provided by Turck of Mulheim an der Ruhr, Germany.

Additionally or alternatively, some examples of product dispersal apparatus 10 include a rotary position sensor 114 (FIG. 8) that more directly senses the gate's degree of opening. In some examples, rotary position sensor 114 is installed at shaft 58 and senses the rotation of gate bell crank 64. Examples of rotary position sensor 114 include a potentiometer, an encoder, a Hall effect rotary sensor, etc. A specific example of rotary position sensor 114 is a Cherry model CU103602, which includes a Hall effect magnet AS500106 and a Hall effect sensor AN820002.

In some examples, product dispersal apparatus 10 includes a controller 116 for controlling the operation of powered linear actuator 22. Controller 116, and/or parts thereof, can be mounted in dashboard 30 or installed at one or more other convenient locations. Some examples of controller 116 and/or parts thereof include a computer, a microprocessor, an integrated circuit, a programmable logic controller, a Color Message Interface, a DataVault system, an FRDS (Gen III fire response dispersal system) plus associated electrical components thereof. The Color Message Interface, DataVault system, and FRDS are products provided by Trotter Controls of Ft. Worth, Tex. Controller 116 is schematically illustrated to represent any type of electrical device or collection of interconnected devices for providing at least one output signal 118 in response to receiving at least one user input signal 120 and at least one feedback signal 122.

In some examples, output signal 118 controls the movement of the powered linear actuator's motor 106. In some examples, an integral amplifier of motor 106 converts output signal 118 to an amplitude suitable for powering motor 106.

User input signal 120 pertains to the pilot's interaction with controller 116 and/or some type of external information. Some examples of user input signal 120 include a potentiometer rotated by the pilot, a touchscreen message interface, a switch, a button, a knob, a gps unit, etc. In some examples, input signal 120 includes external information or commands such as a gps coordinate reading, a speed value based on a rate of change in gps coordinates, a material recipe or specifications of bulk material 14, a gate full-open command, a command to open gate 18 to a certain percentage of full open, a command to close gate tightly, and/or a command to close gate lightly or partially. In some examples, mechanical adjustments of powered linkage assembly 42' determine whether gate 18 closes tightly for liquid product or lightly for dry product.

One or more feedback signals 122 provide controller 116 with an indication as to the position of gate 18. Controller 116 can determine the position of gate 18 in response to feedback signal 122 indicating the position or change in position of one or more other components that move with gate 18. Examples of such components include link 52 or 54, bell cranks 48 and 50, almost any moving part of valve mechanism 56, almost any moving part of powered linear actuator 22, and gate 18 itself.

In some examples, at least part (e.g., product dispersal apparatus 10) of aircraft 12 is operable selectively in a power mode and a manual mode. The manual mode may be a valuable feature in the event of a failure in the power mode of operation.

In the power mode, as shown in FIGS. 8 and 9, lever 38 is left latched at its back position 46 (e.g., via pushbutton 45), while controller 116 commands powered linear actuator 22 to extend and retract to respectively open and close gate 18. Powered linear actuator 22 extends to open gate 18 and retracts to close it. Upon extending, powered linear actuator 4 not only exerts force to open gate 18 but also simultaneously exerts a force 124 against first bell crank 48. Force 124 urges lever 38 in rearward direction 36 to its back position 46, as indicated by an arrow 126. Force 124 helps further ensure that lever 38 does not move in forward direction 34 as powered linear actuator 22 opens gate 18.

In the manual mode, as shown in FIG. 10, powered linear actuator 22 is left deactivated in its retracted position 88, while the pilot manually moves lever 38 forward and back to respectively open and close gate 18. This is similar to the manual method described with respect to FIGS. 1-6.

In some examples, to prevent forcing powered linkage assembly 42' too far, controller 116 inhibits powered linear actuator 22 from extending when lever 38 is in its forward position 44. In some examples, output signal 118 illustrates inhibiting powered linear actuator 22 from extending toward its extended position 86 when lever 38 is in forward position 44. In some examples, output signal 118 also illustrates permitting powered linear actuator 22 to extend toward extended position 86 when lever 38 is in back position 46.

While brake 115 may be an important feature in both the manual and power modes, brake 115 may be particularly important in the manual mode. In some examples, brake 115 is spring loaded to be in a normally engaged braking state when deactivated and being in a disengaged release state upon activating motor 106. Thus, when motor 106 is deactivated, brake 115 prevents motor 106 from spinning in response to manual force and/or other external compressive or tensile forces being applied to linkage assembly 42'. Applying brakes to motor 106 allows powered linear actuator 22 to function as a fixed length link, comparable to that of link 52 or 54. So, if an electrical failure occurs, which prevents operating in the power mode, the system can still be operated in a manual mode just as if powered linear actuator 22 were simply a fixed length link like link 52 or 54.

Figure 11:
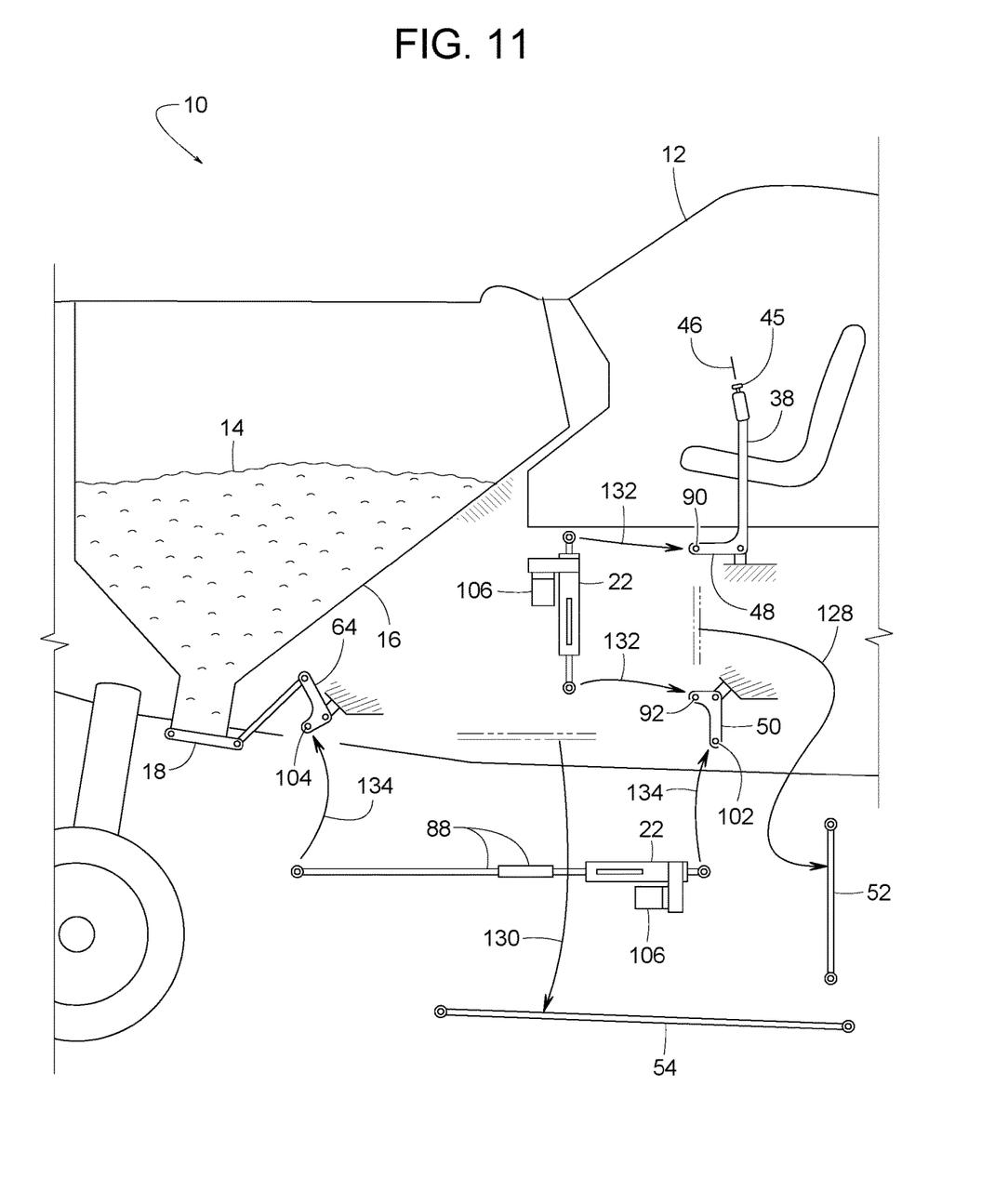
FIG. 11 is a side view similar to FIGS. 6 and 7 but show two links being replaced by two powered linear actuators.
Figure 12:
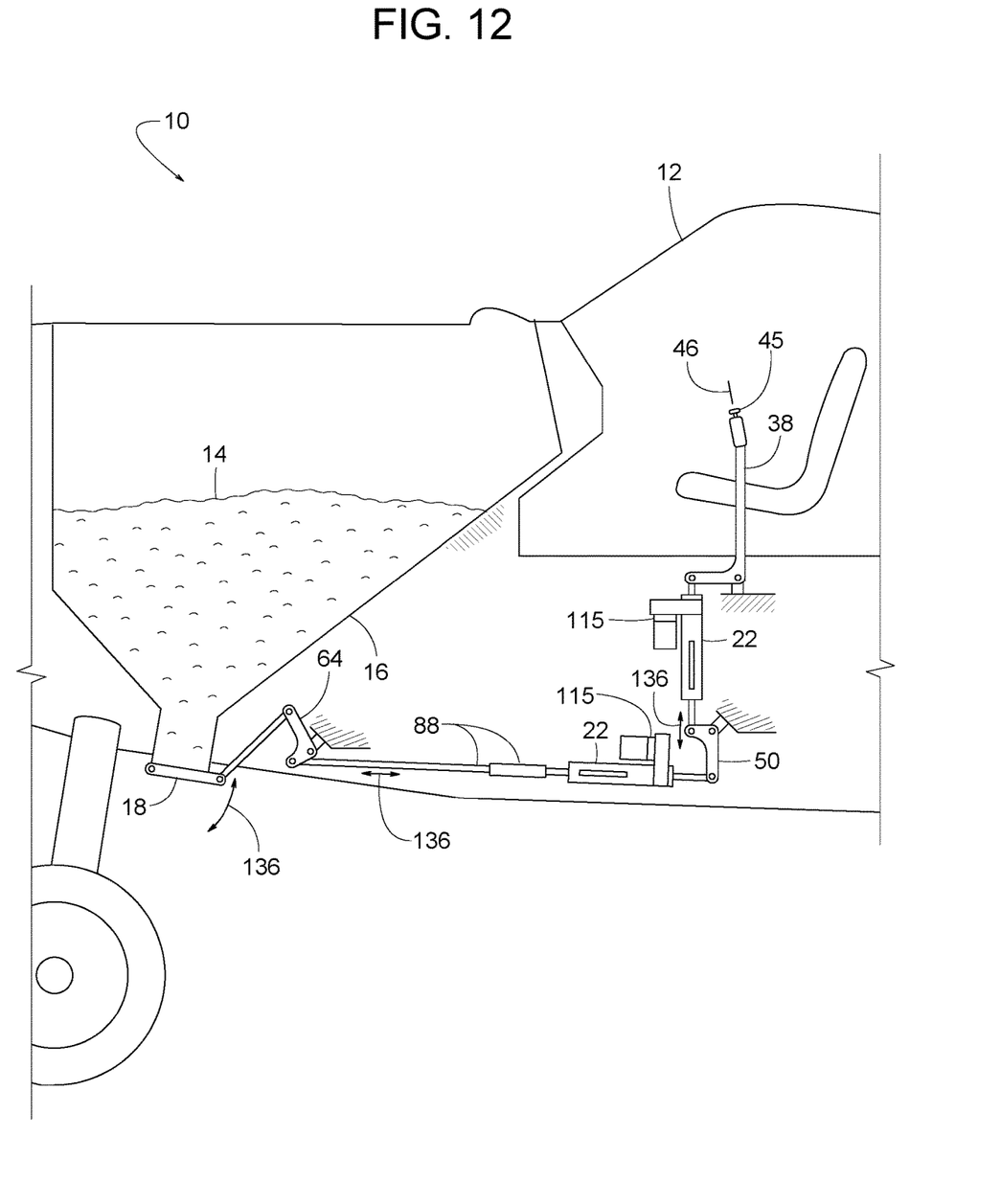
FIG. 12 is a side view similar to FIG. 8 but showing the operation of an example linkage assembly with two powered linear actuators.
Figure 13:
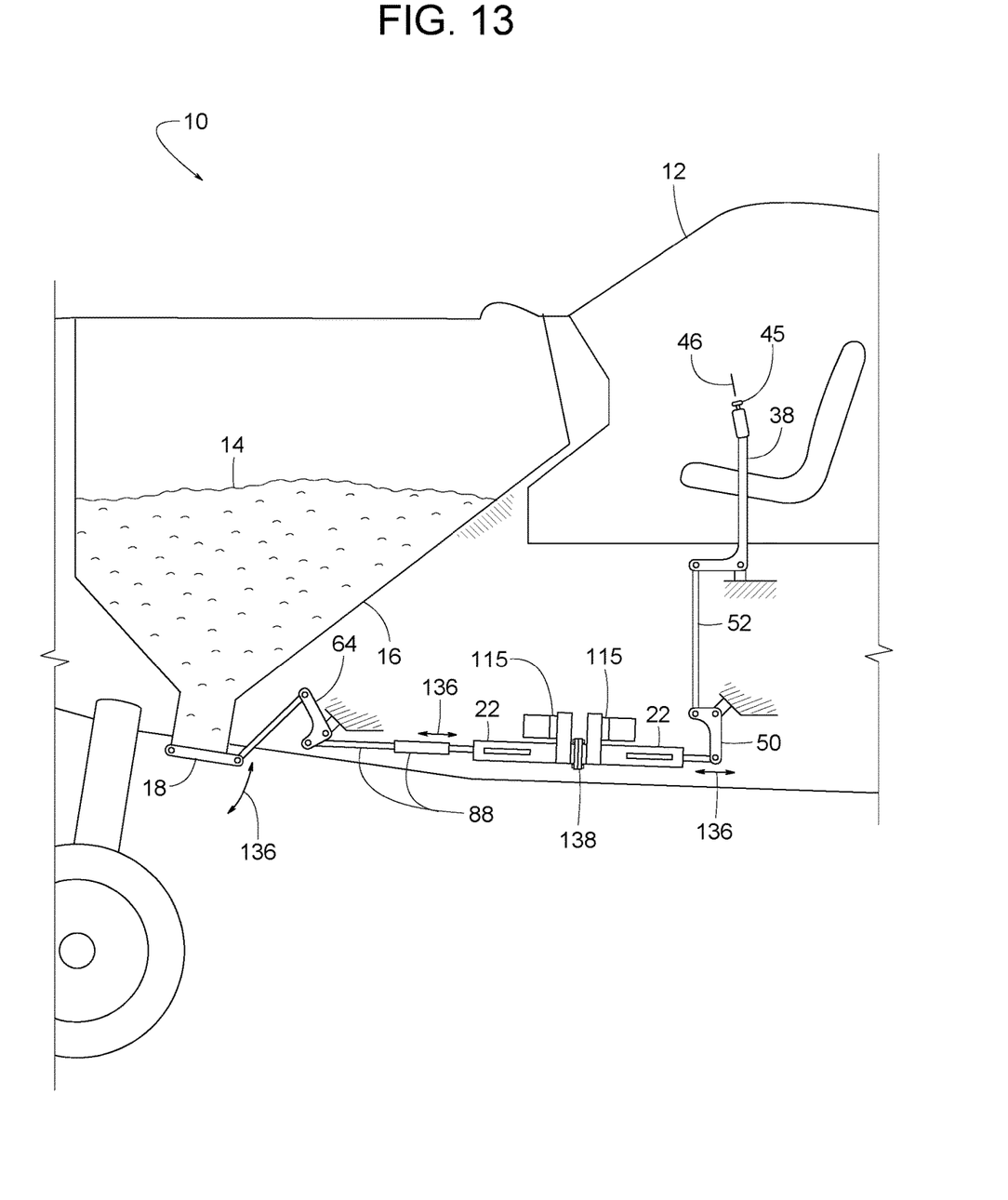
FIG. 13 is a side view similar to FIGS. 8, 9, 10 and 12 but showing an example where two back-to-back powered linear actuators replaced a single fixed-length link.

FIGS. 11-13 show multiple powered linear actuators 22 replacing one or more fixed-length links, such as link 52 and/or 54. FIG. 11 shows a first powered linear actuator 22 replacing link 52 (first link), and a second powered linear actuator 22 (plus extension 88) replacing link 54 (second link). In FIG. 11, arrow 128 represents removing first link 52, arrow 130 represents removing second link 54 from between two points 102 and 104, arrows 132 represent connecting first powered linear actuator 22 to points 90 and 92, and arrows 134 represent installing second powered linear actuator 22 to points 102 and 104. Arrows 136 of FIG. 13 represent moving gate 18 between the open position and the closed position in response to one or both of the first and second powered linear actuators 22 selectively extending and retracting while lever 38 remains at a substantially fixed position (e.g., at back position 46).

In the example shown in FIG. 13, an adapter plate 138 rigidly couples two powered linear actuators 22 in a back-to-back arrangement. The two powered linear actuators 22 plus extension 88 are then used to replace link 54 or 52. In some examples, the two powered linear actuators 22 can be activated individually or simultaneously to achieve a desired outcome.

Using two powered linear actuators 22, instead of just one, provides several benefits. One, the powered linear actuators 22 can be physically smaller because each one only has to extend half the distance of a powered linear actuator in a single actuator linkage assembly. Two, the powered linear actuators 22 can be physically smaller because the total work or output horsepower is shared by both of them. Three, each powered linear actuator 22 can produce double the torque since each one will be moving half as fast as a powered linear actuator of a single actuator linkage assembly. Four, with two powered linear actuators 22, they can be activated simultaneously for a high speed gate operating mode or activated individually or one at a time for a low speed gate operating mode.

In some examples, the two powered linear actuators 22 are of different speeds (e.g., a low speed one and a medium speed one) and can be selectively activated to provide a high speed gate operating mode (activating both powered linear actuators 22), a low speed gate operating mode (activating just the low speed one), and a medium speed gate operating mode (activating just the medium speed one). The term, "speed" as it pertains to powered linear actuator 22 refers to the linear velocity at which the powered linear actuator extends and retracts. For all of the aforementioned examples, whenever a powered linear actuator 22 is deactivated, brake 115 locks the deactivated actuator 22 at a substantially fixed length.

In each of the examples shown in FIGS. 8, 12 and 13, brake 115 holding its respective deactivated linear actuator 22 at a fixed length allows the pilot to seamlessly switch between a power mode and a manual mode in the event of a failure that renders the primary powered actuator system inoperative. As mentioned earlier, in the power mode, powered linear actuator(s) 22 is energized to move gate 18 while lever 38 remains stationary. In the manual mode, powered linear actuator(s) 22 is de-energized, brake 115 holds the deactivated powered linear actuator(s) 22 at a substantially fixed length (functioning as a fixed length link), and the pilot manually moves lever 38 to open or close gate 18.

Some examples of product dispersal apparatus 10 can be defined as follows:

Example-1 A powered linkage assembly for an aircraft that includes a bulk container, the product dispersal apparatus comprising: a gate at a variable position relative to the bulk container; a valve mechanism coupled to the gate to move the gate selectively to an open position and a closed position; a lever attached to the aircraft, the lever being elongate between a handle and a first bell crank; a first link extending between and being pivotally connected to the first bell crank and a second bell crank; and a second link extending between and being pivotally connected to the second bell crank and the valve mechanism, one of the first link and the second link including a first powered linear actuator that is extendible selectively to an extended position and a retracted position to force the valve mechanism to move the gate between the open position and the closed position.

Example-2 The powered linkage assembly of Example-1, wherein the valve mechanism includes a shaft, a gate link, and a crank; the shaft defining an axis at a substantially fixed position relative to the bulk container, the crank being attached to the shaft and being rotatable about the axis, the gate link connecting the crank to the gate, and the first powered linear actuator being spaced apart from the axis.

Example-3 The powered linkage assembly of Example-1, wherein the first powered linear actuator includes a brake and an electric motor, the brake being operable selectively in a braking state and a release state, the brake impeding rotation of the motor when the brake is in the braking state, the brake allowing rotation of the motor when the brake is in the release state, the brake switching from the release state to the braking state upon deactivating the electric motor.

Example-4 The powered linkage assembly of Example-1 further comprising a second powered linear actuator, wherein both the first powered linear actuator and the second powered linear actuator are extendible selectively to the extended position and the retracted position to force the valve mechanism to move the gate between the open position and the closed position, the first link includes the first powered linear actuator, and the second link includes the second powered linear actuator.

Example-5 The powered linkage assembly of Example-1 further comprising a second powered linear actuator, wherein both the first powered linear actuator and the second powered linear actuator are extendible selectively to the extended position and the retracted position to force the valve mechanism to move the gate between the open position and the closed position, the first link includes both the first powered linear actuator and the second powered linear actuator.

Example-6 An aircraft comprising a fuselage; a cockpit supported by the fuselage; a pilot seat in the cockpit, the pilot seat facing in a forward direction opposite a rearward direction; a bulk container supported by the aircraft; a gate at selectively an open position and a closed position relative to the bulk container; a lever attached to the aircraft; and a powered linear actuator coupling the lever to the gate, the powered linear actuator being movable selectively to an extended position and a retracted position, the powered linear actuator simultaneously urging the gate to the open position and urging the lever in the rearward direction in response to the powered linear actuator moving between the retracted position and the extended position.

Example-7 The aircraft of Example-6 further comprising a valve mechanism connected to move the gate between the open position and the closed position; a first bell crank on the lever; a second bell crank; and a link extending between and being pivotally connected to the first bell crank and the second bell crank, the powered linear actuator extending between and being connected to the valve mechanism and the second bell crank; wherein the valve mechanism includes a shaft, a gate link, and a crank; the shaft defining an axis at a substantially fixed position relative to the bulk container, the crank being attached to the shaft and being rotatable about the axis, the gate link connecting the crank to the gate, and the powered linear actuator being spaced apart from the axis.

Example-8 The aircraft of Example-6, wherein the powered linear actuator includes a brake and an electric motor, the brake being operable selectively in a braking state and a release state, the brake impeding rotation of the motor when the brake is in the braking state, the brake allowing rotation of the motor when the brake is in the release state, the brake switching from the release state to the braking state upon deactivating the electric motor.

Example-9 The aircraft of Example-6, further comprising a second powered linear actuator coupling the first powered linear actuator to the gate, the first powered linear actuator coupling the lever to the second powered linear actuator, whereby both the first powered linear actuator and the second powered linear actuator couple the lever to the gate.

Example-10 The aircraft of Example-9, wherein the aircraft is operable selectively in a high speed gate operating mode and a low speed gate operating mode, only one of the first powered linear actuator and the second powered linear actuator being activated in the low speed gate operating mode, and both the first linear actuator and the second linear actuator being activated in the high speed gate operating mode.

Example-11 A method for modifying an aircraft comprising: decoupling the lever from the gate by removing the removable link from the linkage assembly; recoupling the lever to the gate by connecting a powered linear actuator to the first point and the second point of the linkage assembly, the powered linear actuator being movable selectively to an extended position and a retracted position; and moving the gate between the open position and the closed position in response to the powered linear actuator moving between the extended position and the retracted position while the lever remains at a substantially fixed position between the forward position and the back position.

Example-12 The method of Example-11, wherein the aircraft includes a valve mechanism attached to move the gate, the linkage assembly includes a first bell crank, a second bell crank and a retained link, the first bell crank is attached to the lever, the retained link extends between the first bell crank and the second bell crank, the first point is on the second bell crank, and the second point is on the valve mechanism; wherein the valve mechanism includes a shaft, a gate link, and a crank; the shaft defining an axis at a substantially fixed position relative to the bulk container, the crank being attached to the shaft and being rotatable about the axis, the gate link connecting the crank to the gate, and the powered linear actuator being spaced apart from the axis.

Example-13 The method of Example-11, wherein the powered linear actuator includes a brake and an electric motor, the brake being operable selectively in a braking state and a release state, the brake impeding rotation of the motor when the brake is in the braking state, the brake allowing rotation of the motor when the brake is in the release state, the brake switching from the release state to the braking state upon deactivating the electric motor.

Example-14 The aircraft of Example-11, wherein the linkage assembly includes a second link extending between two points of the linkage assembly, and the method further comprising: removing the second link from the two points of the linkage assembly; installing a second powered linear actuator to the two points of the linkage assembly; and moving the gate between the open position and the closed position in response to at least one of the first powered linear actuator and the second powered linear actuator selectively extending and retracting while the lever remains at the substantially fixed position between the forward position and the back position.

Example-15 The aircraft of Example-14, further comprising moving the gate between the open position and the closed position in response to both the first powered linear actuator and the second powered linear actuator selectively extending and retracting while the lever remains at the substantially fixed position between the forward position and the back position.

Example-16 The aircraft of Example-14, further comprising moving the gate between the open position and the closed position in response to only one of the first powered linear actuator and the second powered linear actuator selectively extending and retracting while the lever remains at the substantially fixed position between the forward position and the back position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A powered linkage assembly for an aircraft that includes a cockpit and a bulk container, the powered linkage assembly comprising:
   a gate;
   a valve mechanism coupled to the gate to move the gate selectively to an open position and a closed position;
   a lever attached to the aircraft, the lever being elongate between a handle and a first bell crank;

a first link extending between and being pivotally connected to the first bell crank and a second bell crank; and a second link extending between and being pivotally connected to the second bell crank and the valve mechanism, one of the first link and the second link including a first powered linear actuator that is extendible selectively to an extended position and a retracted position to force the valve mechanism to move the gate between the open position and the closed position, at least part of the aircraft being operable selectively in a power mode and a manual mode such that:

in the power mode, the gate moves between the open position and the closed position in response to the first powered linear actuator moving between the extended position and the retracted position while the lever remains substantially stationary within the cockpit, and in the manual mode, the gate moves between the open position and the closed position in response to the lever moving between a forward position and a back position while the first powered linear actuator remains in the retracted position.

2. The powered linkage assembly of claim 1, wherein the first link includes the first powered linear actuator.

3. The powered linkage assembly of claim 1, wherein the second link includes the first powered linear actuator.

4. The powered linkage assembly of claim 1, wherein the first powered linear actuator is electrically powered.

5. The powered linkage assembly of claim 1, wherein the handle is at a substantially fixed position within a cockpit of the aircraft when the gate is at the open position, and the handle is at the substantially fixed position when the gate is at the closed position.

6. The powered linkage assembly of claim 1, wherein the aircraft includes a pilot seat facing in a forward direction opposite a rearward direction, and the first powered linear actuator urges the handle to move in the rearward direction relative to the pilot seat while simultaneously urging the gate toward the open position.

7. The powered linkage assembly of claim 1, wherein the first powered linear actuator is inhibited from moving to the extended position when the lever is moving in a forward direction relative to the aircraft.

8. The powered linkage assembly of claim 1, wherein the valve mechanism includes a shaft, a gate link, and a crank; the shaft defining an axis at a substantially fixed position relative to the bulk container, the crank being attached to the shaft and being rotatable about the axis, the gate link connecting the crank to the gate, and the first powered linear actuator being spaced apart from the axis.

9. The powered linkage assembly of claim 1, wherein the first powered linear actuator includes a brake and an electric motor, the brake being operable selectively in a braking state and a release state, the brake impeding rotation of the motor when the brake is in the braking state, the brake allowing rotation of the motor when the brake is in the release state, the brake switching from the release state to the braking state upon deactivating the electric motor.

10. The powered linkage assembly of claim 1 further comprising a second powered linear actuator, wherein both the first powered linear actuator and the second powered linear actuator are extendible selectively to the extended position and the retracted position to force the valve mechanism to move the gate between the open position and the closed position, the first link includes the first powered linear actuator, and the second link includes the second powered linear actuator.

11. The powered linkage assembly of claim 1 further comprising a second powered linear actuator, wherein both the first powered linear actuator and the second powered linear actuator are extendible selectively to the extended position and the retracted position to force the valve mechanism to move the gate between the open position and the closed position, the first link includes both the first powered linear actuator and the second powered linear actuator.

* * * * *